United States Patent Office 3,012,023
Patented Dec. 5, 1961

3,012,023
PRODUCTION OF OLEFIN POLYMERS
Arthur William Anderson, Wilmington, John MacMillan Bruce, Jr., Claymont, and Nicholas George Merckling and William Lawrence Truett, Wilmington, Del., assignors to E. I. du Pont de Nemours and Company, Wilmington, Del., a corporation of Delaware
No Drawing. Filed Jan. 25, 1955, Ser. No. 484,034
12 Claims. (Cl. 260—94.9)

This invention relates to a novel step in the production of normally solid ethylene polymers and other polymers of olefinic compounds containing terminal methylene ($=CH_2$).

In processes which have recently been developed for the synthesis of polymeric products from ethylene and/or other olefinic compounds, in the presence of polymerization initiators containing one or more inorganic components for example, an initiator obtained by mixing $TiCl_4$ or $ZrCl_4$ with $Al(alkyl)_3$ or $LiAl(alkyl)_4$), the reaction product contains titanium or zirconium in such a form that it cannot be separated from the organic polymeric component by physical means. In many instances the reaction product is completely soluble in a liquid hydrocarbon medium, such as xylene, yet contains substantial amounts of titanium (or zirconium) which evidently is present as a component of groups which are attached to the long polymer chains. The present invention is concerned with chemical methods for separating titanium or zirconium containing groups from the polymeric chain.

It has been discovered, in accordance with this invention, that by subjecting the above-mentioned polymeric products to the action of oxygen, or an hydroxyl containing reactant, the titanium or zirconium become readily separable therefrom.

The invention can best be understood by considering the following reaction mechanism, which, however, should not be construed as representing the only mechanism which can account for the results achieved.

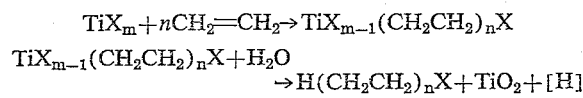

$$TiX_m + nCH_2=CH_2 \rightarrow TiX_{m-1}(CH_2CH_2)_nX$$
$$TiX_{m-1}(CH_2CH_2)_nX + H_2O \rightarrow H(CH_2CH_2)_nX + TiO_2 + [H]$$

In the foregoing formulations $n$ is the number of ethylene units reacting per unit of initiator, X is the group attached to titanium and $m$ is the valence of titanium. In polymerization wherein the catalyst systems contain a titanium compound in combination with an aluminum trialkyl, or a lithium aluminum tetraalkyl as a reducing agent, it is the titanium which becomes bonded to the polyethylene chain in preference to the aluminum. This is in contrast with the method for end group removal, described in the Ziegler et al. patent, U.S. 2,699,547.

Typical initiator systems which are especially effective are those obtained by admixing a component containing titanium or zirconium, attached to a group such as —H, —hydrocarbon, —oxyhydrocarbon, —halohydrocarbon, —halide, etc., in combination with a second component having —H, or —hydrocarbon directly attached to metal. Outstanding examples of the first component are $TiCl_4$, $TiCl_3$, $Ti(O\ hydrocarbon)_4$, and $Ti(O\ hydrocarbon)_3$. Outstanding examples of the second component are sodium acetylide, products formed by contacting metallic sodium with an alkene higher than ethylene, corresponding products from each of the other alkali metals and alkaline earth metals, alkali metal aluminum hydrides, alkali metal borohydrides, alkaline earth metal hydrides, alkali metal hydrides, alkylaluminum chlorides, alkali metal, aluminum alkyls, alkali metal boroalkyls, Grignard reagents, such as phenylmagnesium halides, etc.

The conditions for carrying out the polymerization reaction can be varied rather widely. In general, the polymerization takes place in an inert organic liquid medium such as xylene, toluene, benzene, hexane, isooctane, decane, decalin, etc., at a pressure which is sufficient to maintain the reaction medium in the liquid phase. The pressure can be as low as atmospheric, or as high as 1000 atmospheres, or even higher. Polymerization temperature can be varied widely depending in part on the character of the product which is sought. Temperatures within the range of 0° to 300° C. may be used. In general, however, the process of this invention is most effective when used in conjunction with polymerization reactions carried out at 20° to 150°.

The removal of the polymer end groups by the method of this invention takes place quite rapidly, even at relatively low temperature. In fact, at temperatures of 15° to 50°, the reaction is almost instantaneous if the added reactant is well distributed in the mixture resulting from the polymerization reaction. In order to facilitate contact between the titanium-containing or zirconium-containing group bound to the polymer and the end group-removing reactant, it is preferable that the said reactant be an alcohol. It is not essential that the alcohol be one which is miscible in all proportions with the reaction medium. For example, methanol is highly effective even when the reaction medium is a hydrocarbon, such as cyclohexane, which is not completely miscible therewith. The polymeric product itself need not be dissolved in the reaction medium, and in fact is most frequently dispersed in the liquid medium, in the form of a slurry.

If the reactant is water or oxygen, the end group is converted to an inorganic precipitate from which the polymer can be separated by selective solvents, suitably at elevated temperature. On the other hand, if the reactant is an alcohol, and the reaction medium is a hydrocarbon, it has been discovered that the end group is converted to a product (e.g. a titanate ester, or other ester) which goes into solution. This is highly advantageous especially in the manufacture of polyethylene, because the polymer is not soluble in any liquid hydrocarbon at temperatures of 15° to 50° C., hence the end groups can be removed in the indicated manner, leaving the solid polymer in a form such that it can be recovered by simple filtration and removal of adhering liquid hydrocarbon.

In the latter procedure, the filtrate contains the inorganic constituents which, prior to the alcoholysis, were chemically combined with the polymer. These can be converted to insoluble material by oxidation with gaseous oxygen, as a step in the recovery of the hydrocarbon medium, or used again as one of the components of the initiator as hereinabove described.

The quantity of added end group-removing reactant should be sufficient to react with the end groups, a stoichiometric quantity being sufficent. Larger quantities may be used advantageously, but this is not essential, although contact between the reactants is facilitated by using an excess of the alcohol reactant. From one to ten mols of alcohol, or more per mol of polymeric product is preferred. It is of course not essential to remove all traces of end group components, although with good contact between polymer and end group-removing reactant splitting of the end groups from the polymer can be achieved quite efficiently.

Generally the removal of the titanium-containing of zirconium-containing groups is accompanied by a sudden change in the appearance of the polymeric product. This occurs whether the end group-removing reactant is oxygen, an alcohol, or water. The color is generally improved quite markedly, and a clean, sometimes colorless, product is formed.

In one method of practicing the invention, the end groups are split from the polymer by means of gaseous oxygen, and no effort is made to remove the inorganic residue from the mixture, in which it is allowed to remain as a filler. This of course is not the preferred method where maximum clarity is desired, but where clarity is not essential it is a preferred method.

In practical operations using an alcohol as the end group-removing reactant, it is sometimes helpful to introduce the alcohol reactant in the form of an azeotrope, distilled from a preceding batch of recovered hydrocarbon.

The invention is illustrated further by means of the following examples:

*Example 1.*—Into 1 liter of cyclohexane is placed 3.9 millimols $TiCl_4$ and 1.3 millimols of $LiAl(heptyl)_4$. Ethylene is introduced into the resulting mixture with stirring for 2 hours at 50° C., producing about 65 grams of a polymeric product in the form of a slurry. The polymeric product thus formed contains nearly all of the initiator. The slurry is cooled to 25° C., and 10 cc. dry isopropanol is added with continued stirring. The slurry is filtered, yielding a polymer which is virtually ash-free. The filtrate contains the titanium in dissolved form; on exposure to air the filtrate yields a precipitate of titania.

*Example 2.*—Into 1 liter of cyclohexane is placed 6 millimols $TiCl_4$ and 2 millimols $LiAl(decyl)_4$. Ethylene is introduced into the resulting mixture with stirring for 2.5 hours at 40° to 47° C., producing a slurry containing about 86 grams of polymeric product. The polymeric product thus formed contains nearly all of the initiator. This mixture is cooled to 25° C. and 10 cc. dry methanol is added with continued stirring. The slurry is filtered, yielding a polymer which is virtually ash-free. The filtrate contains the titanium in dissolved form; on exposure to air the filtrate yields a precipitate of titania.

*Example 3.*—Into 1 liter of cyclohexane is placed 6 millimols $ZrCl_4$ and 2 millimols of sodium acetylide. Ethylene is introduced into the resulting mixture with stirring for 10 minutes at 35° C. To the resulting slurry 5 cc. n-butanol is added, and the mixture is filtered, yielding polyethylene which is virtually free of zirconia.

*Example 4.*—Into 200 cc. of cyclohexane is placed 10 millimols tetra(2-ethylhexyl)titanate and 15 ml. of a 3 M ethereal solution of phenylmagnesium bromide. Ethylene is introduced into the resulting mixture for 2 hours at 30° C. at a pressure of 500 lbs. per square inch. The resulting slurry is agitated with 5 cc. of added methanol and filtered, yielding polymer which contains relatively little titanium. In repeating the experiment without the added alcohol, most of the titanium remains with the polymer.

*Example 5.*—Ethylene is polymerized at 170° C. to 190° C. for 2 hours at 750–1000 p.s.i. in the presence of 2.3 grams $TiCl_4$ and 0.86 gram $Al(CH_3)_3$ in 27 ml. cyclohexane, yielding 46 grams of polyethylene. When the product is subjected to the action of steam, the hydrocarbon portion is selectively soluble in boiling benzene, and the inorganic portion is not.

*Example 6.*—A solution of 0.04 M $TiCl_4$ in cyclohexane is stored in a stainless steel tank under nitrogen pressure. Another solution, composed of 0.03 M $LiAl(heptyl)_4$ in cyclohexane is similarly stored in a stainless steel tank. Streams from each of these tanks are united at 50° C. in the proportion of 1 to 1. The combined stream is diluted with 5 times its volume of cyclohexane and pumped continuously through a stainless steel reactor which is equipped with a stirrer, an ethylene inlet means, and a water cooler for withdrawal of heat. Ethylene is introduced into the mixture at the rate of 6 liters per minute at atmospheric pressure with vigorous agitation, maintaining temperature at 40–50° C. The polymerization proceeds readily, yielding a slurry which is continuously withdrawn from the reactor into a solids separator (settler). The solids remain in the receiver, and the liquid is drawn from it. The solid is placed on a large Buchner funnel, and air is sucked through the solid for about 5 minutes to kill the catalyst and improve the color of the product (chemically separating the end groups from the polyethylene chain). The resulting product is a white powder containing small amounts of solvent, which are subsequently removed by evaporation. When melted, the product is not transparent.

The foregoing examples are illustrative only, and numerous modifications of the invention will be apparent to those who are skilled in the art. For instance, the mol ratio of $LiAl(alkyl)_4:TiCl_4$ can be varied with variation in the results obtained. At relatively low pressures (1 to 5 atmospheres) and relatively low temperatures (20° to 100° C.) this ratio should be within the range of 0.3:1.0 to 0.8:1.0 to obtain polyethylene having a melt index of from 10.0 to about 0.01, which is a highly desirable commercial range. With higher proportions of $LiAl(alkyl)_4$ the melt index is lowered (i.e. molecular weight is apparently increased) to such an extent that the workability, or shaping, of the polymer requires methods differing from those currently in use for polyethylene. If the proportion of $LiAl(alkyl)_4$ is too low, the molecular weight is low, and product quality (for plastics applications) suffers.

Moreover, numerous methods for recovering catalyst can be based on the present invention. Zirconium compounds, which are expensive but which are among the most catalysts, can, for example, be recovered and re-used, while cheaper materials such as titanium-containing groups can be removed by the process of this invention without any need for salvaging the titania.

The process of the invention can be conducted batchwise or continuously.

Catalysts for the solvolysis of the end groups can be used if desired, but the reaction is generally rapid enough in the absence of catalysts. Hydrogen chloride may be present during the removal of the end groups, and, when present, may indeed take part in the reaction. Hydrogen chloride can be formed in situ under conditions such that a component such as free $TiCl_4$ undergoes hydrolysis or alcoholysis. To improve contact of such agents as HCl with the polymer undergoing treatment, an oxygenated organic solvent, such as acetone, can be introduced if desired.

Thus, since many different embodiments of the invention will occur to those who are skilled in the art, it is to be understood that the invention is not limited by the specific illustrations hereinabove set forth.

This application is a continuation-in-part of our copending application Serial No. 450,243, filed August 16, 1954, now U.S. Patent 2,905,645.

What is claimed is the following:

1. In a process for preparing normally solid polyethylene by polymerizing ethylene in an inert hydrocarbon liquid medium and in the presence of an initiator which supplies groups having an element of the class consisting of titanium and zirconium attached directly to the polymer, said initiator being the product obtained by admixing a component containing a member of the class consisting of titanium and zirconium, attached to a group of the class consisting of -oxyhydrocarbon and -halide, with a second component having -hydrocarbon attached directly to metal, said metal being of the class consisting of alkali metals, alkaline earth metals and aluminum, the improvement which comprises removing such groups from the polymer molecule by reaction with water.

2. In a process for preparing normally solid polyethylene by polymerizing ethylene in an inert hydrocarbon liquid medium and in the presence of an initiator which supplies groups having an element of the class consisting of titanium and zirconium attached directly to the polymer, said initiator being the product obtained by admixing a component containing a member of the class consisting of titanium and zirconium, attached to a group of the class consisting of -oxyhydrocarbon and -halide, with a second component having -hydrocarbon attached directly to metal, said metal being of the class consisting of alkali metals, alkaline earth metals and aluminum, the improvement which comprises removing such groups from the polymer molecule by reaction with an alkanol having from 1 to 4 carbon atoms per molecule.

3. Process of claim 2 wherein the quantity of said alkanol added is from one to ten mols per equivalent of said group.

4. Process of claim 2, wherein the said polymerization takes place at a temperature of 20° to 150° C., and reaction of the said alkanol and the said polymer takes place at a temperature below the polymerization temperature and in the range of 15° to 50° C.

5. Process of claim 2 wherein the said initiator is the product obtained by admixing $TiCl_4$ with a metal-hydrocarbon compound in an inert liquid hydrocarbon medium.

6. Process of claim 5 wherein said metal-hydrocarbon compound is a lithium aluminum tetraalkyl.

7. Process of claim 5 wherein said metal-hydrocarbon compound is an aluminum trialkyl.

8. Process of claim 2 wherein the said alkanol is added to the polymer in the form of a slurry containing the said inert liquid hydrocarbon medium, whereby the said groups are removed from said polymer.

9. Process of claim 8, wherein the reaction of the said alkanol and the said polymer takes place at a temperature in the range of 15° to 50° C.

10. In a process for preparing normally solid polyethylene by polymerizing ethylene in an inert hydrocarbon liquid medium and in the presence of an initiator which supplies groups having an element of the class consisting of titanium and zirconium attached directly to the polymer, said initiator being the product obtained by admixing a component containing a member of the class consisting of titanium and zirconium, attached to a group of the class consisting of -oxyhydrocarbon and -halide, with a second component having -hydrocarbon attached directly to metal, said metal being of the class consisting of alkali metals, alkaline earth metals and aluminum, the improvement which comprises removing said groups from the polymer molecule by reaction with molecular oxygen until the catalyst is inactive, and thereafter recovering from the resulting mixture the polymer devoid of catalytically active material.

11. In a process for preparing hydrocarbon polymers by polymerization in the presence of an initiator which supplies metal-containing groups to the polymer, said initiator being the product obtained by admixing a component containing a member of the class consisting of titanium and zirconium, attached to a group of the class consisting of -oxyhydrocarbon and -halide, with a second component having -hydrocarbon attached directly to metal, said metal being of the class consisting of alkali metals, alkaline earth metals and aluminum, the improvement which comprises removing such groups from the polymer molecule by means of a reactant which is capable of splitting metal-hydrocarbon bonds, said metal being a member of the class consisting of titanium and zirconium, said reactant being of the class consisting of oxygen, water, and alcohols of the formula $C_nH_{2n+1}OH$ wherein $n$ is a number from 1 to 4 inclusive.

12. In a process for preparing normally solid polyethylene by polymerizing ethylene in the presence of an initiator which supplies metal-containing groups to the polymer, said initiator being the product obtained by admixing a component containing a member of the class consisting of titanium and zirconium, attached to a group of the class consisting of -oxyhydrocarbon and -halide, with a second component having -hydrocarbon attached directly to metal, said metal being of the class consisting of alkali metals, alkaline earth metals and aluminum, the improvement which comprises removing such groups from the polymer molecule by a reactant which is capable of splitting metal-hydrocarbon bonds, said metal being a member of the class consisting of titanium and zirconium, said reactant being of the class consisting of oxygen, water, and alcohols of the formula $C_nH_{2n+1}OH$ wherein $n$ is a number from 1 to 4 inclusive.

References Cited in the file of this patent

UNITED STATES PATENTS

| | | |
|---|---|---|
| 2,453,520 | Langkammerer | Nov. 9, 1948 |
| 2,682,531 | Ernst et al. | June 29, 1954 |
| 2,683,139 | Leary et al. | July 6, 1954 |
| 2,699,457 | Ziegler et al. | Jan. 11, 1955 |
| 2,905,645 | Anderson et al. | Sept. 22, 1959 |

OTHER REFERENCES

"Chem. Reviews," vol. 17 (1935) (Calloway), pp. 327 and 374–377.

Herman et al.: J. Am. Chem. Soc. 75, 3877–3882 (Aug. 20, 1953).

UNITED STATES PATENT OFFICE
CERTIFICATION OF CORRECTION

Patent No. 3,012,023                                      December 5, 1961

Arthur William Anderson et al.

It is hereby certified that error appears in the above numbered patent requiring correction and that the said Letters Patent should read as corrected below.

Column 1, line 19, before "for" insert an opening parenthesis; line 48, for "polymerization" read -- polymerizations --; column 2, line 64, for "of", second occurrence, read -- or --.

Signed and sealed this 24th day of April 1962.

(SEAL)
Attest:

ESTON G. JOHNSON                                          DAVID L. LADD
Attesting Officer                                              Commissioner of Patents